United States Patent
Baudin

(10) Patent No.: US 10,764,091 B2
(45) Date of Patent: Sep. 1, 2020

(54) ROBUST ADAPTIVE METHOD FOR SUPPRESSING INTERFERENCE IN THE PRESENCE OF A SIGNAL OF INTEREST

(71) Applicant: THALES, Courbevoie (FR)

(72) Inventor: Roland Baudin, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/360,806

(22) Filed: Mar. 21, 2019

(65) Prior Publication Data
US 2019/0296941 A1  Sep. 26, 2019

(30) Foreign Application Priority Data

Mar. 22, 2018 (FR) ..................... 18 00239

(51) Int. Cl.
| | |
|---|---|
| H04L 7/10 | (2006.01) |
| H04L 25/02 | (2006.01) |
| H04B 1/10 | (2006.01) |
| H04L 27/26 | (2006.01) |
| H04B 7/08 | (2006.01) |
| H04B 1/12 | (2006.01) |

(52) U.S. Cl.
CPC ....... H04L 25/0204 (2013.01); H04B 1/1027 (2013.01); H04B 1/126 (2013.01); H04B 7/086 (2013.01); H04L 25/0224 (2013.01); H04L 25/0248 (2013.01); H04L 27/2647 (2013.01)

(58) Field of Classification Search
CPC G01S 3/74; G06K 9/0057; H04L 1/06; H04L 27/2647; H04B 7/0845
USPC .......................... 375/347, 260, 267; 342/417
See application file for complete search history.

(56) References Cited

U.S. PATENT DOCUMENTS

| | | | | |
|---|---|---|---|---|
| 5,634,199 A | * | 5/1997 | Gerlach | H01Q 3/2605 455/103 |
| 6,658,234 B1 | * | 12/2003 | Dogan | G01S 3/74 342/373 |
| 9,048,892 B2 | * | 6/2015 | Walton | H04B 7/0417 |

(Continued)

OTHER PUBLICATIONS

Weiss, et al., ""Almost blind" steering vector estimation using second-order moments", IEEE Transactions on Signal Processing, vol. 44, Issue 4, pp. 1024-1027, Apr. 1996.

(Continued)

*Primary Examiner* — Khai Tran
(74) *Attorney, Agent, or Firm* — Baker & Hostetler LLP

(57) ABSTRACT

A method for receiving a signal, includes a useful signal, interfering signals and noise, and for suppressing interfering signals in a multi-channel receiver, comprising steps of:
(a) reception, frequency transposition and digital conversion of the received signal;
(b) estimation of a correlation matrix of the received signals; (c) estimation of the variance of the noise; (d) initial estimation of the arrival directions of the useful and interfering signals; (e) initialization of the powers of the useful and interfering signals; (f) iterative computation: of the current directional vectors of the useful and interfering signal; of the powers of the useful and interfering signals; of the amplitude/phase errors of assumed directional vectors with respect to the current directional vectors; and of the arrival directions of the useful and interfering signals; (i) suppression of the interfering signals from the signal received in step (a).

7 Claims, 5 Drawing Sheets

(56) References Cited

U.S. PATENT DOCUMENTS

| | | | | |
|---|---|---|---|---|
| 2004/0189523 | A1* | 9/2004 | Kishigami | G01S 3/74 342/417 |
| 2006/0007043 | A1* | 1/2006 | Xin | G01S 3/46 342/417 |
| 2017/0163327 | A1* | 6/2017 | Yang | H04B 7/0413 |

OTHER PUBLICATIONS

Van Trees, "Optimum Array Processing", Part IV of Detection, Estimation, and Modulation Theory, 2002.

Li, et al., "Robust Adaptive Beamforming", Wiley, 2006.

Vorobyov, "Principles of minimum variance robust adaptive beamforming design", Signal Processing 93, pp. 3264-3277, 2013.

Schmidt, "Multiple Emitter Location and Signal Parameter Estimation", IEEE Transactions on Antennas and Propogation, pp. 276-280, 1986.

Li, et al., "On robust Capon beamforming and diagonal loading", IEEE Transactions on Signal Processing, vol. 51, No. 7, pp. 1702-1715, 2003.

Mallipeddi, et al., "Robust adaptive beamforming based on covariance matrix reconstruction for look direction mismatch", Progress in Electromagnetics Research Letters, vol. 25, pp. 37-46, 2011.

Wang, et al., "Robust mainlobe interference suppression for coherent interference environment", EURASIP Journal on Advances in Signal Processing, Biomed Central Ltd, London, UK, vol. 2016, No. 1, pp. 1-7, Dec. 13, 2016.

Zhang, et al., "A robust adaptive beamformer based on desired signal covariance matrix estimation", 2016 IEEE International Conference on Signal Processing, Communications and Computing (ICSPCC), pp. 1-4, 2016.

Liu, et al., "Adaptive beamforming algorithms with robustness against steering vector mismatch of signals", IET Radar, Sonar & Navigation, vol. 11, Issue 12, pp. 1831-1838, Dec. 7, 2017.

European Search Report issued in European Patent Application No. 19164003.6 dated Aug. 9, 2019.

* cited by examiner

ROBUST ADAPTIVE METHOD FOR SUPPRESSING INTERFERENCE IN THE PRESENCE OF A SIGNAL OF INTEREST

CROSS-REFERENCE TO RELATED APPLICATIONS

This application claims priority to foreign French patent application No. FR 1800239, filed on Mar. 22, 2018, the disclosure of which is incorporated by reference in its entirety.

FIELD OF THE INVENTION

The invention relates to radio-communication systems, in particular terrestrial or satellite radio-communication systems and more particularly to digital beamforming.

BACKGROUND

The capacity of (terrestrial or satellite) mobile-radio telecommunications systems is limited by co-channel interference. Specifically, although by virtue of digital beamforming it is possible for a plurality of remote users to share the same frequency resource (the same channel), the spatial isolation required for this sharing is however not perfect and inevitably leads to the appearance of interfering signals. Complete or partial suppression of these interfering signals is therefore a key objective of the digital signal processing associated with beam formation.

In the case of digital beamforming in reception (FIG. 1), it is necessary to consider N radiating elements of an antenna array receiving signals $\underline{x}(t)=[x_1(t), \ldots, x_N(t)]^T$ that are converted into digital samples $\underline{x}[k]=[x_1[k], x_2[k], \ldots, x_N[k]]^T$, N being an integer higher than or equal to 3. The digital samples allow a correlation matrix $R_x$ containing information on the arrival directions of the signals, which consist of a useful signal, interfering signals and noise, to be constructed. The interfering signals are also referred to as interference.

The vector $\underline{x}[k]$ of the samples of the signal received by the N radiating elements of the antenna may be written:

$$\underline{x}[k]=[x_1[k], x_2[k], \ldots x_N[k]]^T = \underline{s}_u[k] + \underline{s}_i[k] + \underline{s}_b[k] \quad (1)$$

where $\underline{x}[k]$ represents the K vectors of dimension N×1 of the samples of the received signals, k being a natural integer comprised between 1 and K, K being the number of samples, $\underline{s}_u[k]$ being the useful signal and $\underline{s}_i[k]+\underline{s}_b[k]$ the interference and noise.

The narrowband assumption is assumed to apply to the array (H. L. Van Trees, "Optimum Array Processing", Part IV of Detection, Estimation and Modulation Theory, Wiley Interscience, 2002), i.e. the maximum propagation delay between the radiating elements of the antenna is assumed to be very much shorter than $1/(\pi B)$, where B is the bandwidth of the signal. In this case, the vector of the useful signal $\underline{s}_u[k]$ may be written $\underline{s}_u[k]=u[k]\underline{a}(\theta_u, \phi_u)$, with $u[k]$ the amplitude of the useful signal and $\underline{a}(\theta_u, \phi_u)$ the directional vector of the antenna in the direction $(\theta_u, \phi_u)$ of the useful signal. Under the narrowband assumption, the directional vector is independent of the frequency of the signal.

Likewise, the interference vector $\underline{s}_i[k]$ may be expressed as follows: $\underline{s}_i[k]=\sum_{l=1}^{L} i_l[k]\underline{a}(\theta_{i_l}, \phi_{i_l})$, with $i_l[k]$ the signal of the l-ith interfering signal and $\underline{a}(\theta_{i_l}, \phi_{i_l})$ the directional vector of the antenna in the direction $(\theta_{i_l}, \phi_{i_l})$ of the l-ith interfering signal.

The directional vector $\underline{a}(\theta, \phi)$ is a vector in the algebraic sense, and more precisely a vector of complex functions of the two variables $\theta$ and $\phi$. It represents the amplitude and phase response of the N radiating elements of the antenna array in the direction $(\theta, \phi)$.

This directional vector may be measured in the laboratory for a given antenna and for a set of directions $(\theta, \phi)$. A numerical or analytical model of the directional vector may also be available. For example, for an equispaced linear array (ELA) of N radiating elements, the n-th component of the vector $\underline{a}(\theta, \phi)$ may be written (with $\phi=90°$):

$$a_n(\theta) = \exp\left(j\frac{2\pi}{\lambda}d(n-1)\sin\theta\right) \quad (2)$$

where $\lambda$ is the wavelength and d the distance between the radiating elements.

Nevertheless, when the antenna is in operation, it may be subjected to temperature variations or geometric deformations. The radio-frequency reception chains located after the antenna are also subjected to temperature drifts and are not completely identical. As a result, the "current" directional vector (that of the antenna in operation) is different from the "assumed" directional vector (that measured in the laboratory or given by a model). The difference between these two vectors, for a given direction, is a vector of errors commonly referred to as "amplitude/phase errors", since they affect both the amplitude and the phase of each component of the directional vector. These amplitude/phase errors have a negative effect on the performance of most interference suppression methods. These errors may be dependent on the direction of the signal, such as in the case of geometric deformations for example, or independent of direction, as in the case of disparities between reception chains.

The signal $y[k]$ of the formed beam may be written:

$$y[k] = \sum_{n=1}^{N} w_n^* x_n[k] = \underline{w}^H \underline{x}[k] \quad (3)$$

where $\underline{w}^H$ is the conjugate transpose of the complex weighting vector $\underline{w}=[w_1, \ldots, w_N]^T$.

The formed beams, such as shown in FIG. 1, may therefore be written: $y_1[k]=\underline{w}_1^H \underline{x}_1[k]$ for beam 1, $y_2[k]=\underline{w}_2^H \underline{x}_2[k]$ for beam 2 and $y_m[k]=\underline{w}_M^H \underline{x}_M[k]$ for beam M.

To form a beam directed toward the useful signal and suppress interference, it is necessary to compute a complex weighting vector such as to make the signal output from the beam as similar as possible to the useful signal, i.e. such that $y[k] \approx u[k]$. This is equivalent to saying the signal-to-noise-plus-interference ratio (SINR) must be maximized. This ratio is an indicator of the quality of the communication and is directly related to the maximum throughput of the link.

The correlation matrix $R_x$ of the received signals, representing the interdependence of the samples of the signal received by the N radiating elements of the antenna, is here written $R_x=R_u+R_{ib}$, with $R_u$ the correlation matrix of the useful signal and $R_{ib}$ the correlation matrix of the interference and noise.

The estimate of the matrix $R_x$ computed from the samples $\underline{x}[k]$ of the received signal vector is the basic information that is used by all adaptive interference suppression methods.

The SINR may be expressed directly as a function of the correlation matrices and of the weighting vector w to be computed:

$$SINR = \frac{\underline{w}^H R_u \underline{w}}{\underline{w}^H R_{ib} \underline{w}} \quad (4)$$

The aim of interference suppression methods is to maximize SINR and they often implement an inversion or diagonalization of the correlation matrix $R_x$.

Depending on the system, there are three conventional situations in which interference suppression methods are implemented:

$1^{st}$ situation: The emission position of the useful signal, also called the arrival direction of the useful signal, $(\theta_u, \phi_u)$, is known, and it is possible to observe the sum of the interference and noise in the absence of the useful signal. Therefore $R_x = R_{ib}$ and $(\theta_u, \phi_u)$ are each known;

$2^{nd}$ situation: The position of the useful signal is not known but a portion of the emitted signal (pilot sequences, for example) is precisely known. The sum of the useful signal, of the interference and of the noise is then observed. Therefore $R_x = R_u + R_{ib}$ and u[k] is partially known;

$3^{rd}$ situation: The position of the useful signal is known but it is not possible to observe the sum of the interference and of the noise in the absence of the useful signal. The sum of the useful signal, of the interference and of the noise is then observed. Therefore $R_x = R_u + R_{ib}$ and $(\theta_u, \phi_u)$ are each known.

The first two situations allow a performance that is satisfactory in terms of interference suppression to be obtained using conventional well-known methods, even when amplitude/phase errors are present in the directional vectors of the useful signal and of the interfering signals or when the position $(\theta_u, \phi_u)$ of the useful signal is not precisely known. For example, the minimum variance distortionless response (MVDR) method may be used in the first situation and the minimum mean square error (MMSE) method may be implemented in the second situation (H. L. Van Trees, "Optimum Array Processing", Part IV of Detection, Estimation and Modulation Theory, Wiley Interscience, 2002).

However, in space or terrestrial radio-communications, it is in general not possible (for reasons of spectral efficiency, throughput and system-level constraints) to reserve a time or frequency slot to estimate the correlation matrix in the absence of useful signal. Situation 1 is therefore not possible.

Nevertheless sequences incorporated into the useful signal may be known beforehand, this corresponding to situation 2. However, the suppression of co-channel interference then requires the pilot sequence associated with each user to be identified, this in certain systems notably complicating implementation.

As regards situation 3, the Capon method is the interference suppression method conventionally used, this method consisting in minimizing the total power of the received signal under a constraint of unit directivity in the direction of the useful signal. The weighting $\underline{w}$ is then calculated in the following way (H. L. Van Trees, "Optimum Array Processing", Part IV of Detection, Estimation and Modulation Theory, Wiley Interscience, 2002):

$$\underline{w} = \frac{R_x^{-1} \underline{a}(\theta_u, \phi_u)}{\underline{a}(\theta_u, \phi_u)^H R_x^{-1} \underline{a}(\theta_u, \phi_u)} \quad (5)$$

It is only in the absence of amplitude/phase errors and if the position of the useful signal is perfectly known that the conventional Capon method allows a satisfactory performance to be obtained. Specifically, in the presence of errors in the directional vectors or indeed when the position of the useful signal is not precisely known, the Capon method leads to an undesired suppression of the useful signal (FIGS. 2a and 2b). This effect is disadvantageous and manifests itself even when the errors are of low level. The conventional Capon method is therefore not robust with respect to errors when a useful signal is present. The article by Y. Wang et al., "Robust mainlobe interference suppression for coherent interference environment" published in "EURASIP Journal on advances in signal processing" in 2016 gives an example of use of the Capon method to suppress interference signals in the mainlobe of an array of omnidirectional antennas.

FIGS. 2a and 2b show an example of interference suppression for an equispaced linear array (ELA) of 10 elements. In FIG. 2a the useful signal is not suppressed whereas in FIG. 2b the useful signal is suppressed because of a 0.1° error in the position of the useful signal.

In the literature, many methods have been proposed for solving the problem of the robustness of adaptive beamforming in the presence of a useful signal. For the most part these methods may be grouped into the following categories (J. Li and P. Stoica, "Robust adaptive beamforming", Wiley, 2006; S. A. Vorobyov, "Principles of minimum variance robust adaptive beamforming design", Signal Processing, 93:3264-3277, 2013):

Diagonal Loading Methods (B. D. Carlson, "Covariance matrix estimation errors and diagonal loading in adaptive arrays", IEEE Transactions on Aerospace and Electronic Systems, 24:397-401, 1988): A positive constant λ is added to the diagonal of the correlation matrix $R_x$ of the received signals, which becomes $R_x + \lambda I_N$, where $I_N$ is an identity matrix of order N. This allows the addition of a fictional noise masking the useful signal and preventing its suppression to be simulated, λ being the power of the fictional noise. However, the performance of this method is very sensitive to the setting of the constant λ and, at the present time, this problem has not been satisfactorily solved.

Methods with Directivity Constraints, Derivative Constraints, Etc.

(M. H. Er, "Adaptive antenna array under directional and spatial derivative constraints", IEEE Proceedings H-Microwaves Antennas and Propagation, 135:414-419, 1988): It is a question of attempting to protect the useful signal by applying constraints, so that the directivity of the useful signal remains high enough in the presence of errors. The applied constraints consume degrees of freedom of the antenna, this resulting in a decrease in the capacity to reject interference and therefore in a performance that is not very good.

Methods Based on Orthogonality Between the Signal Subspace and the Noise Subspace (A. Haimovich et al., "Adaptive antenna arrays using eigenvector methods", IEEE International Symposium on Antennas and Propagation, 3:980-983, 1988): These methods aim to decrease the effect of errors by virtue of an orthogonal projection. Nevertheless, they are ineffective because the presence of the useful signal is not sufficiently removed.

Methods Based on a Sphere or an Ellipsoid of Uncertainty (J. Li et al., "On robust Capon beamforming and diagonal loading", IEEE Transactions on Signal Processing, 51:1702-1715, 2003): They assume, for example, that the discrepancy between the current directional vector and the assumed directional vector of the useful signal is limited, i.e. that $\|\underline{a}_{current} - \underline{a}_{assumed}\| < \varepsilon$. The weighting vector used in the beamforming is then computed using an optimization under a constraint of inclusion of the directional vector in the sphere or ellipsoid of uncertainty. These methods give good results provided that the power of the useful signal is lower than the power of the interference. When the useful signal level becomes comparable to or higher than the level of the interference, the useful signal is suppressed. Some of these methods are very complex and expensive in computational resources.

Methods Based on a Reconstruction of the Correlation Matrix of the Interference and of the Noise (Y. Gu et al., "Robust adaptive beamforming based on interference covariance matrix reconstruction and steering vector estimation", IEEE Transactions on Signal Processing, 60:3881-3885, 2012): They estimate the directional vectors of the interference so as to construct a matrix $\hat{R}_{ib}$ that is not greatly different from $R_{ib}$, so as to return to situation 1 described above, in which the interference suppression methods are robust.

Methods Based on the Estimation of the Directional Vectors (A. Khabbazibasmen et al., "Robust adaptive beamforming based on steering vector estimation with as little as possible prior information", IEEE Transactions on Signal Processing, 2974-2987, 2012): They are based on the fact that knowledge of the directional vector of the useful signal is important if the robustness of the Capon method is to be improved. They are not robust when the signal-to-noise ratio of the useful signal is high.

Probabilistic Methods (S. Vorobyov et al., "On the relationship between robust minimum variance beamformers with probabilistic and worst-case distortionless response constraints", IEEE Transactions on Signal Processing, 56:5719-5724, 2008): They are based on the observation that position errors and amplitude/phase errors are random, and compute a robust weighting in such a way that the probability of suppression of the useful signal remains low. Just like the preceding methods, these methods have a mediocre performance when the signal-to-noise ratio of the useful signal is high.

Other Methods:

They are mixtures of the preceding methods.

SUMMARY OF THE INVENTION

The invention aims to overcome the aforementioned drawbacks and limitations of the prior art. More precisely, it aims to provide an adaptive method for suppressing interference in the presence of a useful signal, which method is particularly robust to amplitude/phase errors that are independent of direction and to imprecisions in position, even when these are large.

One subject of the invention is therefore a method for receiving a signal comprising a useful signal, interfering signals and noise, and for suppressing interfering signals in a multi-channel receiver, comprising steps of:

(a) reception, frequency transposition and digital conversion of the signal received over each of the channels of the multi-channel receiver, so as to obtain a digital multi-channel signal, this multi-channel signal corresponding to the sum of the useful signal, of the interfering signals and of the noise, the receiver comprising an antenna array that is defined by a complex vector function $\underline{a}(\theta, \phi)$ of two variables $\theta$ and $\phi$ defining a direction in space, comprising one component for each channel of the antenna and each component of which represents the amplitude and phase response of a respective channel of the antenna in the direction $(\theta, \phi)$, the useful signal being defined by an unknown amplitude $u[k]$ and by an unknown current direction $(\theta_u, \phi_u)$, the interfering signals being defined by an unknown amplitude $s_l[k]$ and by an unknown current direction $(\theta_{i_l}, \phi_{i_l})$, l representing the l-th interfering signal, the complex vector $\underline{a}(\theta_u, \phi_u)$, which is referred to as the current directional vector of the useful signal, comprising one component for each channel of the antenna, each component representing the amplitude and phase response of a respective channel of the antenna in the current arrival direction $(\theta_u, \phi_u)$ of the useful signal, and, the complex vectors $\underline{a}(\theta_{i_l}, \phi_{i_l})$, which are referred to as the current directional vectors of the interfering signals, each comprising one component for each channel of the antenna, each component representing the amplitude and phase response of a respective channel of the antenna in the true arrival direction $(\theta_{i_l}, \phi_{i_l})$ of the interfering signals;

(b) estimation, from the digital multi-channel signal, of a correlation matrix $\hat{R}_x$ of the signals received over the channels of the receiver;

(c) estimation of the variance of the noise, from the eigenvectors and eigenvalues of the correlation matrix $\hat{R}_x$;

(d) initial estimation of the arrival direction $(\hat{\theta}_u, \hat{\phi}_u)$ of the useful signal and of the arrival directions $(\hat{\theta}_{i_l}, \hat{\phi}_{i_l})$ of the interfering signals from computation of the MUSIC spatial spectrum, then computation of assumed directional vectors $\underline{\tilde{a}}(\hat{\theta}_u, \hat{\phi}_u)$ in the direction estimated for the useful signal and of assumed direction vectors $\underline{\tilde{a}}(\hat{\theta}_{i_l}, \hat{\phi}_{i_l})$ in the directions estimated for the interfering signals;

(e) initializations:
  computation of a diagonal matrix the elements of which are the powers of the useful signal and of the interfering signals computed from the directional vectors estimated in step (d) and from the correlation matrix $\hat{R}_x$; and
  computation of a complex diagonal matrix the elements of which represent the disparity between the current directional vectors and the directional vectors assumed in step (d), this matrix being called the amplitude/phase error matrix;

(f) iterative computation:
  of a matrix of the current estimated directional vectors the elements of which are the product of the elements of the amplitude/phase error matrix and of the assumed directional vectors in the estimated directions;

of the powers of the useful signals and of the interfering signals, from the matrix of the estimated current directional vectors;

of the matrix of the amplitude/phase errors; and of the arrival direction $(\hat{\theta}_u, \hat{\phi}_u)$ of the useful signal and of the arrival directions $(\hat{\theta}_{i_l}, \hat{\phi}_{i_l})$ of the interfering signals, the current directional vectors of the useful signal and of the interfering signals being computed, in a first iteration, with respect to the assumed directional vectors computed in step (d) and to the amplitude/phase errors initialized in step (e), then, for each of a plurality of following iterations, with respect to the directional vectors assumed and to the amplitude/phase errors computed in the preceding iteration, the number of iterations being predefined by the user; and (i) suppression of the interfering signals from the signal received in step (a).

According to particular embodiments of the invention:

step (f) is followed by a step (g) of reconstruction of the correlation matrix of the interfering signals and of the noise, this step being carried out before said step (i);

step (g) is followed by a step (h) of computation of a weighting matrix from the correlation matrix computed in step (g), step (h) being carried out before step (i); and the number of iterations is comprised between 15 and 25; and more particularly is 20.

The invention also relates to a multi-channel receiver configured to receive a signal comprising a useful signal and interfering signals over a plurality of channels, and to reject the interfering signals, comprising: an antenna comprising at least three radiating elements; at least three radio chains for receiving, transposing and discretizing said signal received over each of the channels of the receiver, in order to obtain a discretized multi-channel signal, the radio chains each comprising one of the radiating elements of the antenna; and computing circuits, wherein the computing circuits are configured to suppress said interfering signals using the method of one of the preceding embodiments of the invention.

According to particular embodiments of the invention:

the computing circuits comprise a digital signal processor, or a programmable integrated circuit, or an application-specific integrated circuit;

the multi-channel receiver belongs to the receiving portion of the payload of a satellite; and the multi-channel receiver belongs to a base station of a terrestrial mobile-radio system.

BRIEF DESCRIPTION OF THE DRAWINGS

Other features, details and advantages of the invention will become apparent on reading the description given with reference to the appended figures, which are given by way of example and show, respectively.

DETAILED DESCRIPTION

Below, the following notations are used:

^ (hat) indicates an estimated quantity;

~ (tilde) indicates a quantity the value of which is approximately known ("assumed" value)

$^H$ is the transpose-conjugate operator; and $^T$ is the transpose operator.

Figure 1:
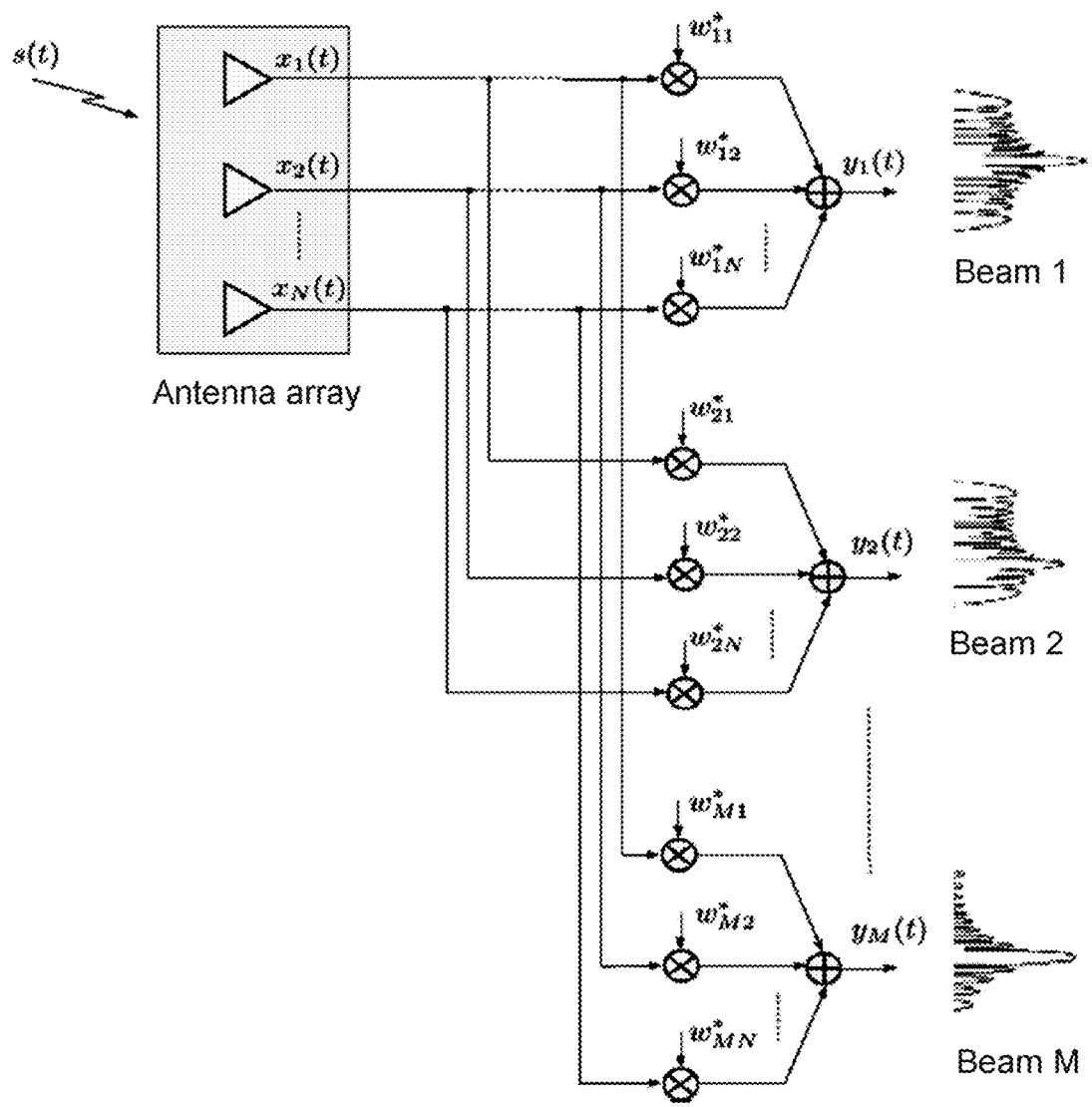
FIG. 1, an explanatory schematic of beamforming in reception.
Figure 2A:
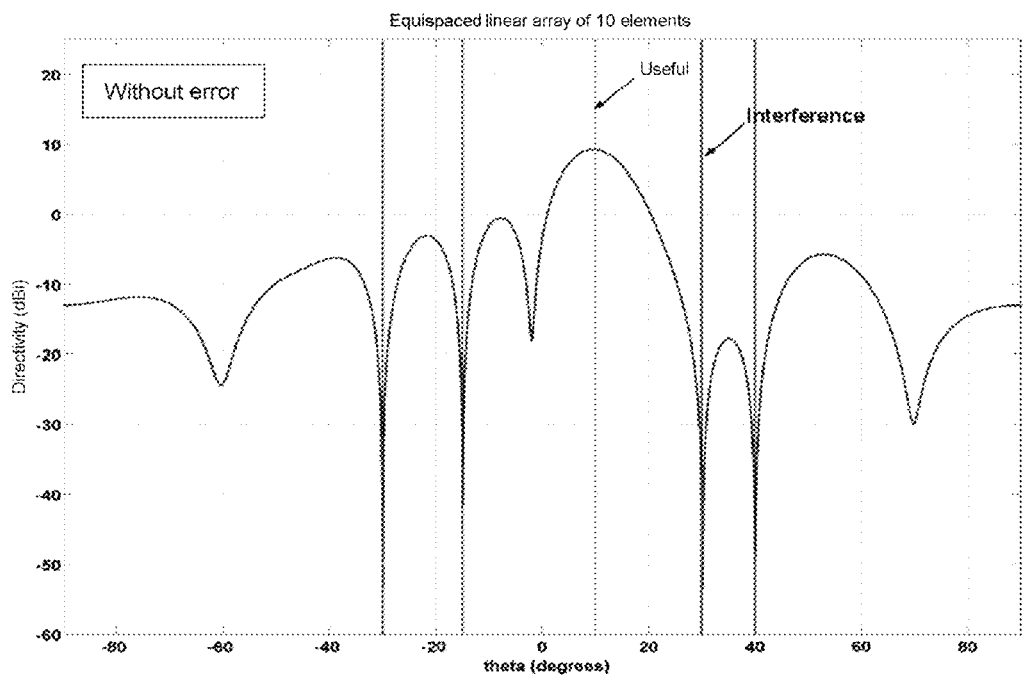
FIGS. 2a and 2b, an example of suppression of interference carried out with a prior-art method, the Capon method.
Figure 2B:
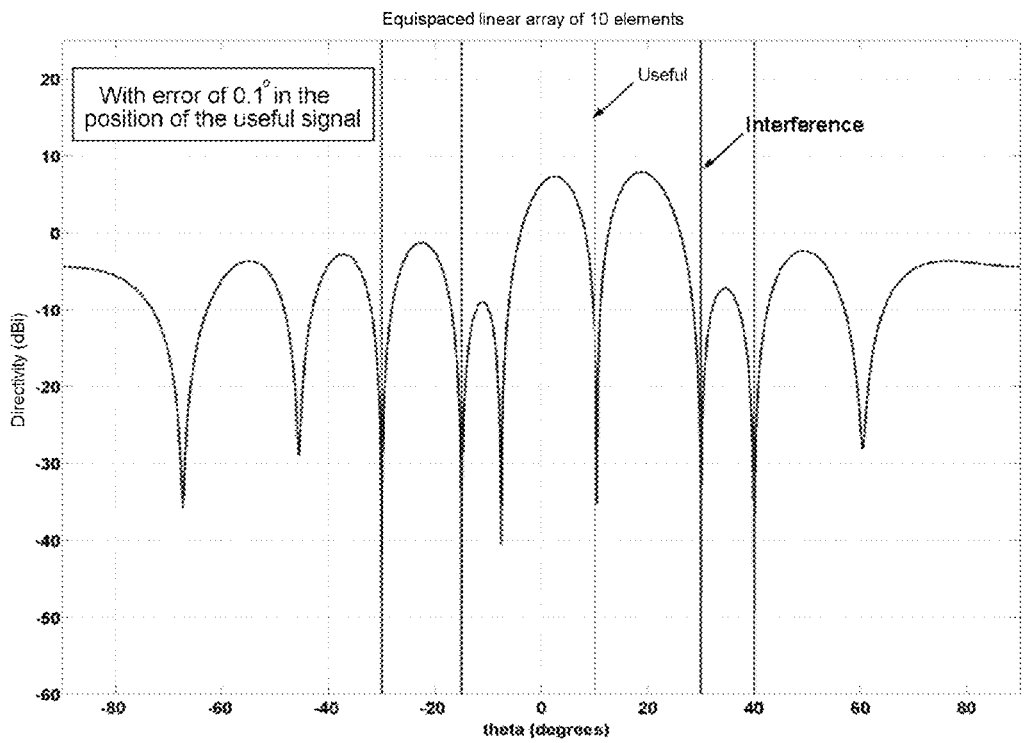
Figure 3:
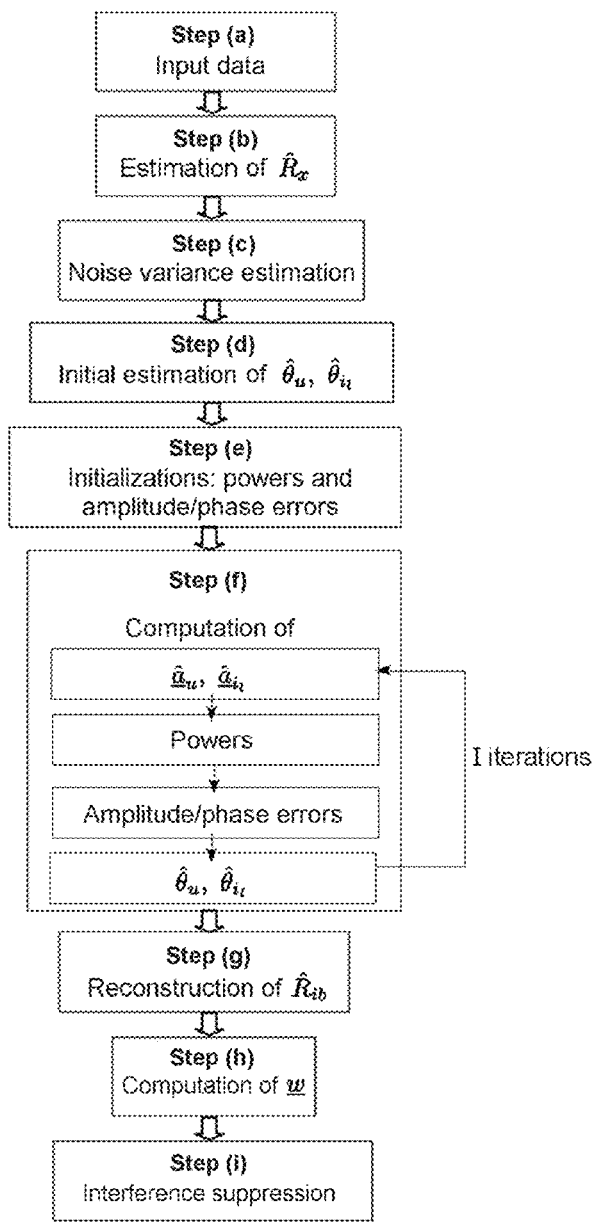
FIG. 3, a chart illustrating the interference suppression method according to one embodiment of the invention.

FIG. 3 shows a chart illustrating the interference suppression method according to one embodiment of the invention. The received signal comprises a useful signal, interfering signals and noise. To simplify the notations, a one-dimensional antenna is considered. In this case, the directional vectors $\underline{a}(\theta)$ depend solely on elevation angle $\theta$. The method is generalizable without difficulty to the case of a two-dimensional antenna the directional vectors $\underline{a}(\theta, \phi)$ of which depend on elevation $\theta$ and azimuth $\phi$.

The first step of the method, step (a), consists in reception, frequency transposition and digital conversion of a signal received by each of the channels of a multi-channel receiver so as to obtain a digital multi-channel signal. The multi-channel signal corresponds to the sum of the useful signal, of the interfering signals and of the noise. The response of the antenna in the direction $\theta_u$ of the useful signal is described by the current directional vector $\underline{a}(\theta_u)$, which comprises one component for each channel of the multi-channel receiver. The response of the antenna in the direction $\theta_{i_l}$ of the l-th interfering signal is described by the current directional vector $\underline{a}(\theta_{i_l})$, which comprises one component for each channel of the multi-channel receiver.

It is assumed that the digital multi-channel signal comprises a finite number K of sample vectors and the multi-channel receiver comprises N radiating elements, N being an integer higher than or equal to 3 and K being a positive integer. The following are also assumed to be known:

the maximum angular error $\Delta_{max}$ in the position of the useful signal;

the assumed angular position $\tilde{\theta}_u$ of the useful signal; and for any direction $\theta$, assumed directional vectors $\underline{\tilde{a}}(\theta)$, these vectors being measured in the laboratory or computed using a model.

It is also assumed that the directions of the interference signals are not located in the angular sector $[\tilde{\theta}_u - \Delta_{max}; \tilde{\theta}_u + \Delta_{max}]$, and that the amplitude/phase errors are independent of direction. This allows a complex yet diagonal matrix G to be obtained, G being the matrix of the amplitude/phase errors. Nevertheless, it is also possible to apply the method in the case of amplitude/phase errors that are dependent on direction.

In the second step of the method, step (b), a correlation matrix, denoted $\hat{R}_x$, is estimated from the K sample vectors $\underline{x}[k]$ of the received signal using the conventional sample estimator:

$$\hat{R}_x = \frac{1}{K} \sum_{k=1}^{K} \underline{x}[k]\underline{x}[k]^H \qquad (6)$$

Step (c) of the method consists in estimating the power of the noise included in the received signal. To do this, the estimated correlation matrix $\hat{R}_r$ is decomposed into eigenvalues and eigenvectors. The matrix $\hat{R}_x$ may then be written:

$$\hat{R}_x = U\Lambda U^H \quad (7)$$

where U is a complex identity matrix of N×N size containing the eigenvectors of $\hat{R}_x$ and $\Lambda$ is a real diagonal matrix of N×N size containing the eigenvalues of $\hat{R}_x$. As $\hat{R}_x$ is Hermitian, i.e. $\hat{R}_x = \hat{R}_x^H$, and defined to be positive, its eigenvalues are real positive numbers.

The number of interfering signals is denoted L, where L is an integer higher than or equal to 1. If this number L is not known, the total number M of signals (useful signal plus interfering signals) is estimated using the Akaike information criterion (H. L. Van Trees, "Optimum Array Processing", Part IV of Detection, Estimation and Modulation Theory, Wiley Interscience, 2002), when the signal-to-noise ratio of the signals is sufficiently high, typically higher than −10 dB.

According to the publication by Schmidt (R. O. Schmidt, "Multiple Emitter Location and Signal Parameter Estimation", IEEE Transactions on Antennas and Propagation, 276-280, 1986) the matrix $\Lambda$ possesses (N−M) identical eigenvalues, equal to the variance of the noise, which is denoted $\sigma^2$. By reordering the eigenvalues (and conjointly the eigenvectors), the following is obtained:

$$\Lambda = \text{diag}[\lambda_1, \lambda_2, \ldots, \lambda_M, \sigma^2, \ldots, \sigma^2] \quad (8)$$

where $\lambda_1 > \lambda_2 > \ldots > \lambda_M$ are the eigenvalues of $\hat{R}_x$.

The form of the matrix $\Lambda$ allows the variance of the noise $\hat{\sigma}^2$ to be directly estimated, this variance $\hat{\sigma}^2$ being obtained by averaging the (N−M) lowest diagonal elements of $\Lambda$.

In step (d), the arrival directions of the useful and interfering signals are estimated using the conventional MUSIC method. To do this, the matrices U and $\Lambda$ are decomposed into two portions, one for the noise and the other for the useful signal and the interfering signals. Equation (7) then becomes:

$$\hat{R}_x \approx U_s \Lambda_s U_s^H + \hat{\sigma}^2 U_b U_b^H \quad (9)$$

where $\Lambda_s$ is the real diagonal matrix of the M eigenvalues $\lambda_1$ to $\lambda_m > \hat{\sigma}^2$, $U_s$ is the matrix of the M associated eigenvectors and $U_b$ is the matrix of the (N−M) eigenvectors associated with the (N−M) eigenvalues approximately equal to $\hat{\sigma}^2$. The matrix $U_s$ is a complex identity matrix of N×M size and of rank M and that defines the signal subspace (useful signal and interfering signals). The matrix $U_b$ is a complex identity matrix of N×(N−M) size and of rank (N−M) and that defines the noise subspace.

The noise subspace and the signal subspace are orthogonal. The scalar product of any vector of the signal subspace and of any vector of the noise subspace is therefore zero. However, the current directional vector $\underline{a}(\theta_u)$ of the useful signal and the current directional vectors $\underline{a}(\theta_{i_l})$ of the interfering signals belong to the signal subspace, therefore:

$$U_b^H \underline{a}(\theta_u) = \underline{0} \quad (10)$$
$$U_b^H \underline{a}(\theta_{i_1}) = \underline{0}$$
$$\ldots$$
$$U_b^H \underline{a}(\theta_{i_L}) = \underline{0}$$

The property of orthogonality is exploited to identify the arrival directions $\theta_u, \theta_{i_1}, \ldots, \theta_{i_L}$ of the useful and interfering signals. To do this, for each direction $\theta$, the positive real quantity $P(\theta)$ is computed, to construct the so-called MUSIC spatial spectrum or the MUSIC spectrum. This spectrum becomes infinite when $\theta$ is identical to one of the arrival directions of the signals and therefore allows these directions to be identified. It is expressed by the following equation:

$$P(\theta) = \frac{1}{\underline{a}(\theta)^H U_b U_b^H \underline{a}(\theta)} \quad (11)$$

and has the property that $$P(\theta) \xrightarrow[\theta=\theta_u]{} \infty \text{ and } P(\theta) \xrightarrow[\theta=\theta_{i_l}]{} \infty$$

where l=1, 2, . . . , L.

In practice, the current directional vectors $\underline{a}(\theta)$ are not known, only the assumed directional vectors $\underline{\tilde{a}}(\theta)$ being known. An estimate of the MUSIC spatial spectrum is thus calculated, this estimate taking the form:

$$\hat{P}(\theta) = \frac{1}{\underline{\tilde{a}}(\theta)^H U_b U_b^H \underline{\tilde{a}}(\theta)} \quad (12)$$

The M highest maxima, i.e. the M values of $\theta$ that maximise $\hat{P}(\theta)$, correspond to the arrival directions of the M signals (useful signal and interfering signals). Under the initial assumptions, the angle $\hat{\theta}_u$ hypothetically located in the interval $[\hat{\theta}_u - \Delta_{max}; \hat{\theta}_u + \Delta_{max}]$ corresponds to an estimation of the angle of the useful signal, whereas the L=M−1 other angles $\hat{\theta}_{i_l}$, located outside of this interval, correspond to estimations of the angles of the L interfering signals. By virtue of these estimations, it is possible to obtain an initial estimation of the assumed directional vector $\underline{\tilde{a}}(\hat{\theta}_u)$ of the useful signal and of the assumed directional vectors $\underline{\tilde{a}}(\hat{\theta}_{i_l})$ of the interfering signals in the estimated directions. It is then possible to form the matrix $\tilde{A} = [\underline{\tilde{a}}(\hat{\theta}_u), \underline{\tilde{a}}(\hat{\theta}_{i_1}), \ldots, \underline{\tilde{a}}(\hat{\theta}_{i_L})]$ of the assumed directional vectors in the estimated directions.

Noting $A = [\underline{a}(\theta_u), \underline{a}(\theta_{i_1}), \ldots, \underline{a}(\theta_{i_L})]$ the N×M matrix of the current directional vectors and P the real diagonal matrix of the powers of the M signals, the correlation matrix $\hat{R}_x$ may be written:

$$\hat{R}_x \approx APA + \hat{\sigma}^2 I_N \quad (13)$$

Using the eigen-decomposition of $\hat{R}_x$, the above equation is equivalent to:

$$APA \approx U_s \Gamma_s U_s^H \quad (14)$$

with $\Gamma_s = \Lambda_s - \hat{\sigma}^2 I_m$.

Weiss and Friedlander (A. J. Weiss and B. Friedlander, "'Almost blind" steering vector estimation using second-order moments", IEEE Transactions on Signal Processing, 56: 5719-5724, 2008) have shown that equation (14) is true if and only if there is a complex identity matrix Q (rotation matrix) such that $$AP^{1/2} \approx U_s \Gamma_s^{1/2} Q \quad (15)$$

The computation of the matrix A may then be computed by minimizing the square of the Frobenius norm (sum of the moduli squared of the elements) of the difference of the two sides of the above equation, namely $\|AP^{1/2} - U_s \Gamma_s^{1/2} Q\|_F^2$. This minimization is carried out using the iterative algorithm of step (f), the principle of which is after Weiss and Friedlander.

To do this, it is assumed that the matrix A of the current directional vectors may be written in the form:

$$A = G\overline{A} \quad (16)$$

with G an N×N diagonal complex matrix. The matrix G is the matrix of the amplitude/phase errors, which are independent of direction. The matrix G is unknown and must be estimated in step (f). The real diagonal matrix P of the powers of the signals is also unknown and will also be estimated in step (f). Below, the estimates of the matrices A, G and P are denoted $\hat{A}$, $\hat{G}$ and $\hat{P}$, respectively. Therefore, it is assumed that:

$$\hat{A} = \hat{G}\hat{\overline{A}} \quad (17)$$

Step (e) is a step of initialization of the iterative portion (f) of the method. The matrix $\hat{G}$ is initialized to the identity matrix, this amounting to initializing the matrix $\hat{\overline{A}}$ to $\hat{A}$.

Using the Capon power estimator, the elements of the matrix $\hat{P}$ are initialized to $1/[\underline{\hat{a}}(\theta)^H \hat{R}_x^{-1} \underline{\hat{a}}(\theta)]$ where $\theta = \hat{\theta}_u, \hat{\theta}_{i_1}, \ldots, \hat{\theta}_{i_L}$.

The following constant matrices are also computed:

$$\Gamma_s = \Lambda_s - \hat{\sigma}^2 I_M \quad (18)$$

$$B = U_s \Gamma_s^{1/2} \quad (19)$$

The matrix $\Gamma_s$ is a real diagonal square matrix of M×M size, the matrix $I_m$ is an identity matrix of order M and the matrix B is a complex rectangular matrix of N×M size.

Step (f) then consists in computing, iteratively, the matrix $\hat{G}$ so as to compute the current directional vectors from the assumed directional vectors in the estimated directions. The number of iterations is finite and set by the user. It is generally comprised between 15 and 25 and may for example be equal to 20 for an equispaced linear array of 10 radiating elements. In the first iteration, the matrix $\hat{\overline{A}}$ is calculated from the matrices $\hat{G}$ and $\hat{A}$ obtained in step (e). In the following iterations, the matrix $\hat{\overline{A}}$ is computed using equation (17), with the matrices $\hat{G}$ and $\hat{A}$ obtained in the preceding iteration.

In each iteration, firstly the singular value decomposition (SVD) of the matrix $B^H \hat{\overline{A}} \hat{P}^{1/2}$ is calculated so as to obtain:

$$B^H \hat{\overline{A}} \hat{P}^{1/2} = U' \Sigma V^H \quad (20)$$

with U' and V the matrices of the eigenvectors to the left and right of $B^H \hat{\overline{A}} \hat{P}^{1/2}$ and $\Sigma$ the diagonal matrix of the singular values. The matrices U' and V are complex identity matrices of M×M size. It may then be shown that the rotation matrix Q is such that:

$$Q = U'V^H \quad (21)$$

Secondly, the elements $\hat{p}_m^{1/2}$ of the matrix $\hat{P}^{1/2}$ are computed. To do this, the m-th column of the matrix $\hat{\overline{A}}$ is denoted $\underline{u}_m$ and the m-th column of the matrix BQ is denoted $\underline{v}_m$. The complex vectors $\underline{u}_m$ and $\underline{v}_m$ are of N×1 size. The real diagonal elements $\bar{p}_m^{1/2}$ of $\hat{P}^{1/2}$ may be written, form a natural integer comprised between 1 and M:

$$\hat{p}_m^{1/2} = \max\left\{0; \frac{\Re[\underline{v}_m^H \underline{u}_m]}{\|\underline{v}_m\|^2}\right\} \quad (22)$$

Thirdly, the amplitude/phase errors, i.e. the matrix $\hat{G}$, are estimated. To do this, the column vector corresponding to the transposition of the n-th row of the matrix $\hat{\overline{A}} \hat{P}^{1/2}$ is denoted $\underline{y}_n$, and the column vector corresponding to the transposition of the n-th row of the matrix BQ is denoted $\underline{z}_n$.

The vectors $\vec{y}_n$ and $\underline{z}_n$ are M×1 in size. The complex diagonal elements $\hat{g}_n$ of the matrix d are calculated using the following equation, where n is a natural integer comprised between 1 and N:

$$\hat{g}_n = \frac{\underline{y}_n^H \underline{z}_n}{\|\underline{y}_n\|^2} \quad (23)$$

The $\hat{g}_n$ represent the estimation of the amplitude/phase errors, which are assumed to be independent of direction.

By virtue of the new estimation of $\hat{G}$, it is possible to re-estimate more precisely the current directional vectors. Next, these new current directional vectors will be used to compute a new MUSIC spatial spectrum and to obtain a new estimation of the arrival directions. Afterwards, the following iteration is passed to and the matrices Q, $\hat{P}^{1/2}$, $\hat{G}$, etc., are computed anew.

Equations (21) to (23) are based on the algorithm of Weiss-Friedlander (A. J. Weiss and B. Friedlander, ""Almost Blind" steering vector estimation using second-order moments", IEEE Transactions on Signal Processing, 44:1024-1027, 1996).

At the end of these iterations, the following are obtained:
- an estimate of the arrival directions $\hat{\theta}_u, \hat{\theta}_{i_1}, \ldots, \hat{\theta}_{i_L}$ of the signals;
- an estimate of the complex diagonal matrix $\hat{G}$ of the amplitude/phase errors; and
- an estimate of the real diagonal matrix $\hat{P}$ of the powers of the signals.

Using these results, it is possible to estimate the current directional vectors of the useful signal and of the interference signals using two different methods, called "method 1" and "method 2", which are described below.

For method 1, the estimate of the current directional vector of the useful signal is denoted $\hat{\underline{a}}_u^{(1)}$ and the estimate of the current directional vector of the interference signal l is denoted $\hat{\underline{a}}_{i_l}^{(1)}$.

Likewise, for method 2, the estimate of the current directional vector of the useful signal is denoted $\hat{\underline{a}}_u^{(2)}$ and the estimate of the current directional vector of the interference signal l is denoted $\hat{\underline{a}}_{i_l}^{(1)}$.

For method 1, the following follow directly from (17):

$$\hat{\underline{a}}_u^{(1)} = \hat{G}\underline{\hat{a}}(\hat{\theta}_u) \quad (24)$$

$$\hat{\underline{a}}_{i_l}^{(1)} = \hat{G}\underline{\hat{a}}(\hat{\theta}_{i_l}) \quad (25)$$

For method 2, equation (15) is used and it is deduced therefrom that:

$$\hat{A} \approx U_s \Gamma_s^{1/2} Q \hat{P}^{-1/2} = BQ\hat{P}^{-1/2} \quad (26)$$

The directional vector $\hat{\underline{a}}_u^{(2)}$ is then the first column of the matrix $BQ\hat{P}^{-1/2}$ and the directional vector $\hat{\underline{a}}_{i_l}^{(2)}$ is the l-th column thereof.

The matrix of the estimated current directional vectors of the interfering signals for method j (j=1, 2) is denoted $\hat{A}_i^{(j)} = [\vec{a}_{i_1}^{(j)}, \ldots, \hat{\underline{a}}_{i_L}^{(j)}]$ and the diagonal matrix of the estimated powers $\hat{p}_{i_1}, \ldots, \hat{p}_{i_L}$ of the interfering signals is denoted $\hat{P}_i$.

In step (g), it is then possible to estimate ("reconstruct") the correlation matrix $\hat{R}_{ib}$ of the interference and noise in the form (for j=1, 2):

$$\hat{R}_{ib}^{(j)} = \hat{A}_i^{(j)} \hat{P}_i^{(j)} \hat{A}_i^{(j)H} + \hat{\sigma}^2 I_N \quad (27)$$

The correlation matrix $\hat{R}_{ib}^{(j)}$ of the interference and noise may then be used to apply the MVDR method, in order to calculate the beamforming weighting vector in the following form (H. L. Van Trees, "Optimum Array Processing", Part IV of Detection, Estimation and Modulation Theory, Wiley Intersciences, 2002):

$$w_{MVDR} = \frac{R_{ib}^{-1} a_u}{a_u^H R_{ib}^{-1} a_u} \quad (28)$$

As the matrix $R_{ib}$ does not contain the useful signal, the MVDR method is robust.

Neglecting the denominator, which is merely a proportionality factor that has no influence on the SINR, it is therefore possible to calculate a weighting vector for each method:

$$\underline{w}^{(j)} = [R_{ib}^{(j)}]^{-1} \underline{\hat{a}}_u^{(j)} \quad (29)$$

The weighting vectors obtained for j=1, 2 are then normalized so as to have $\|\underline{w}^{(1)}\| = \|\underline{w}^{(2)}\| = 1$. The choice between the two weighting vectors is made by comparing the total output power and by choosing the weighting vector that delivers the lowest power, because it is this weighting vector that necessarily best rejects the interfering signals, provided of course that the useful signal has been preserved.

The final weighting vector is then obtained:

$$\underline{w} = \underline{w}^{(1)}, \text{ if } \underline{w}^{(1)H} \hat{R}_x \underline{w}^{(1)} < \underline{w}^{(2)H} \hat{R}_x \underline{w}^{(2)}$$

$$\underline{w} = \underline{w}^{(2)}, \text{ if not} \quad (30)$$

In practice, in simulations it is observed that method 1 is chosen most often and that the performance of the two methods coincides when the number of samples K becomes high.

Figure 4A:
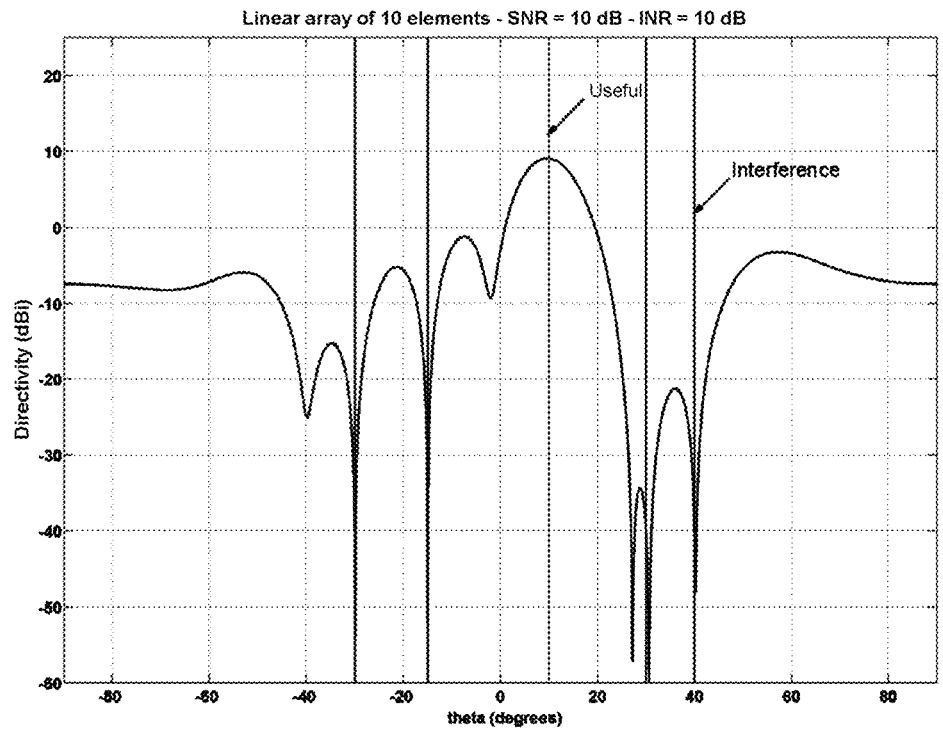
FIGS. 4a and 4b, an example of interference suppression carried out according to one embodiment of the invention.
Figure 4B:
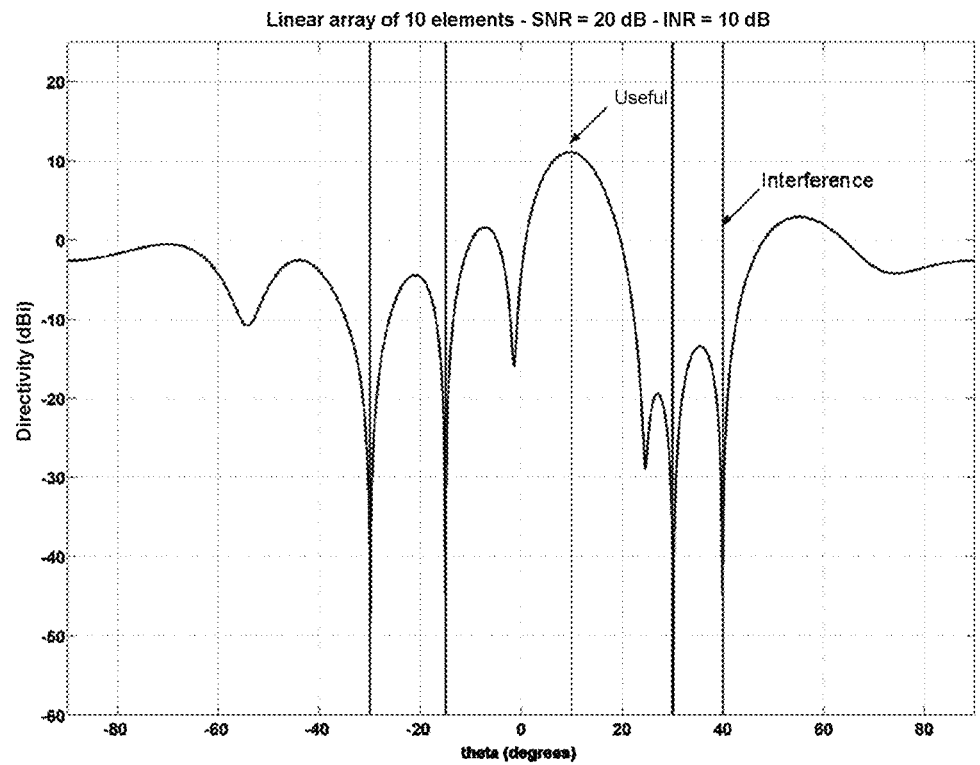

This interference suppression method may be implemented in the computing circuits of a multi-channel receiver. The computing circuits may be a digital signal processor (DSP), a programmable integrated circuit (FPGA), or an application-specific integrated circuit (ASIC). FIGS. 4a and 4b show an example of suppression of interference signals according to one embodiment of the invention implemented with an ELA of 10 omnidirectional radiating elements. The figures show the pattern (the directivity) of a beam formed with the method according to the invention for this antenna array. Four interference signals are present in the received signal. In FIG. 4a, the signal-to-noise ratio (SNR) is 10 dB and in FIG. 4b, the SNR is 20 dB. It may be seen that in both cases the useful signal is preserved and that the interference is indeed suppressed.

Figure 5:
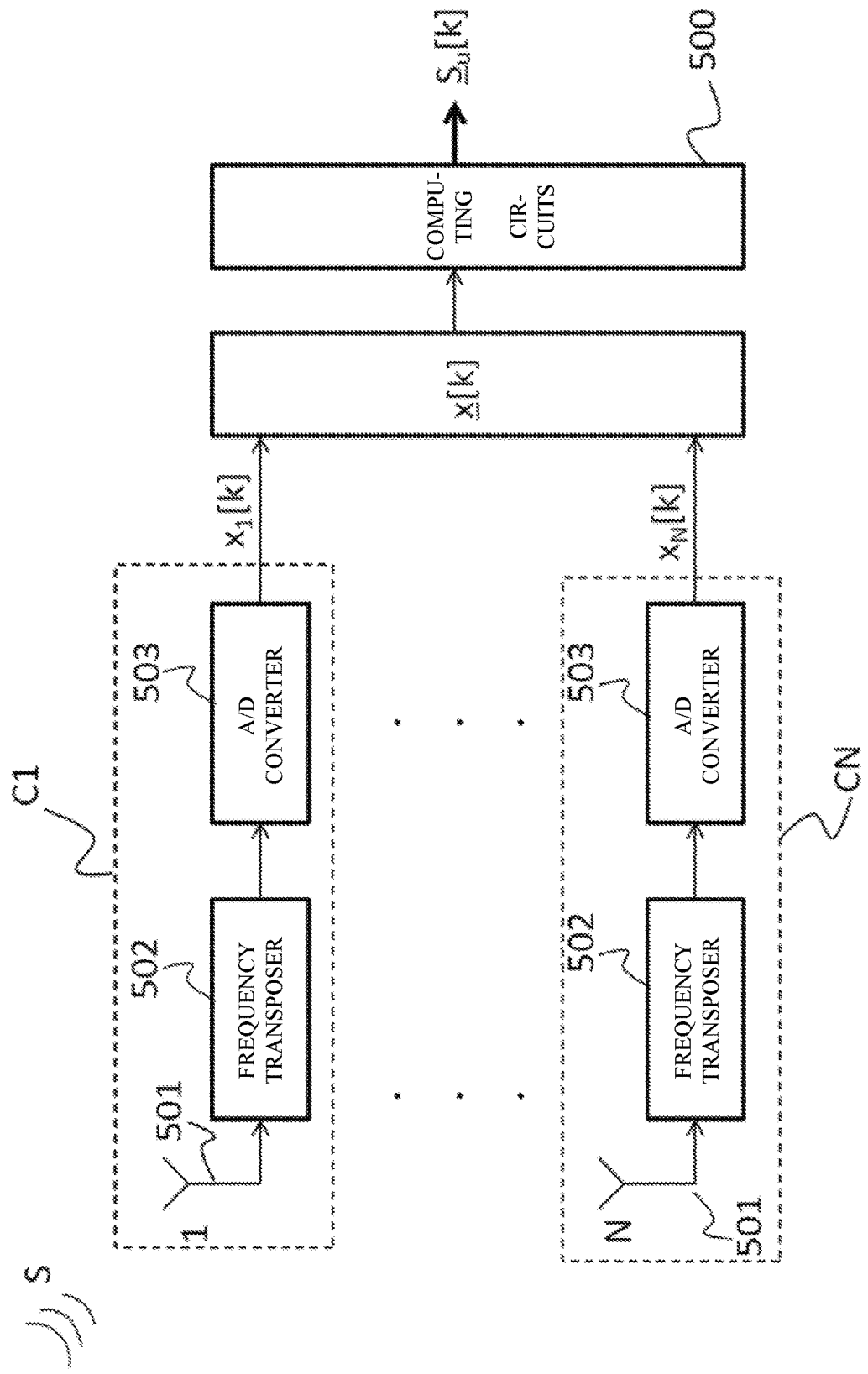
FIG. 5, a multi-channel receiver according to one embodiment of the invention.

FIG. 5 shows a multi-channel receiver according to one embodiment of the invention. This receiver comprises N radio-frequency (RF) chains, with N an integer higher than or equal to 3. Only the first RF chain C1 and the N-th RF chain CN are shown in this figure. A signal S comprising a useful signal, interfering signals and noise is received by the N RF chains by virtue of their radiating element 501. The signal thus received by each of the N RF chains is frequency transposed 502 then converted to digital by an analogue-digital converter 503. The computing circuits 500 of the multi-channel receiver thus receive a sample vector $\underline{x}[k]$, such that $\underline{x}[k] = [x_1[k], \ldots, x_N[k]]^T$ is the signal received, frequency transposed and converted to digital by the n-th RF chain, n being an integer comprised between 1 and N. The computing circuits 500 apply the method for suppressing interfering signals according to the invention in order to deliver as output the useful signal $S_u[k]$.

The invention claimed is:

1. A method for (i) receiving a signal, the signal comprising a signal of interest, interfering signals, and noise, and (ii) suppressing interfering signals in a multi-channel receiver, comprising steps of:
   (a) reception, frequency transposition, and digital conversion of the signal received over each of a plurality of channels of the multi-channel receiver, to obtain a digital multi-channel signal corresponding to a sum of the signal of interest, the interfering signals, and the noise, the receiver comprising an antenna array that comprises a plurality of radiating elements, each of which corresponds to one channel of the multi-channel receiver, and that is defined by a complex vector function $\underline{a}(\theta, \phi)$ of two variables $\theta$ and $\phi$ defining a direction in space, comprising one component for each of the channels of the receiver and each component of which represents an amplitude and a phase response of the respective channel of the receiver in the direction in the space $(\theta, \phi)$, the signal of interest being defined by an unknown amplitude u[k] and by an unknown current arrival direction $(\theta_u, \phi_u)$, the interfering signals being defined by an unknown amplitude $s_l[k]$ and by an unknown current arrival direction $(\theta_{i_l}, \phi_{i_l})$, l representing an l-th interfering signal, a current directional complex vector $\underline{a}(\theta_u, \phi_u)$ of the signal of interest comprising one component for each of the channels of the receiver, each component representing an amplitude and a phase response of the respective channel of the receiver in the current arrival direction $(\theta_u, \phi_u)$ of the signal of interest, and, each of a plurality of current directional complex vectors $\underline{a}(\theta_{i_l}, \phi_{i_l})$ of the interfering signals comprising one component for each of the channels of the receiver, each component representing an amplitude and a phase response of the respective channel of the receiver in the current arrival direction $(\theta_{i_l}, \phi_{i_l})$ of the interfering signals;
   (b) estimation, from the digital multi-channel signal, of a correlation matrix $\hat{R}_x$ of the signal received over the channels of the receiver;
   (c) estimation of a variance of the noise, from eigenvectors and eigenvalues of the correlation matrix $\hat{R}_x$;
   (d) initial estimation of an arrival direction $(\hat{\theta}_u, \hat{\phi}_u)$ of the signal of interest and of an arrival direction $(\hat{\theta}_{i_l}, \hat{\phi}_{i_l})$ of the interfering signals from computation of a multiple signal classification (MUSIC) spatial spectrum, then computation of assumed directional vectors $\underline{\hat{a}}(\hat{\theta}_u, \hat{\phi}_u)$ in a direction estimated for the signal of interest and of assumed direction vectors $\underline{\hat{a}}(\hat{\theta}_{i_l}, \hat{\phi}_{i_l})$ in directions estimated for the interfering signals;
   (e) initialization of a:
      computation of a diagonal matrix elements of which are powers of the signal of interest and of the interfering signals computed from the directional vectors assumed in step (d) and from the correlation matrix $\hat{R}_x$, and
      computation of an amplitude/phase error matrix elements of which represent disparity between the current directional complex vectors and the directional vectors assumed in step (d);
   (f) iterative computation:
      of a matrix of current estimated directional vectors elements of which are a product of the elements of the amplitude/phase error matrix and of the directional vectors assumed in step (d) in the estimated directions;

of the powers of the signal of interest and the interfering signals, from the matrix of the current estimated directional vectors;
of the amplitude/phase error matrix; and
of the arrival direction $(\hat{\theta}_u, \hat{\phi}_u)$ of the signal of interest and the arrival direction $(\hat{\theta}_{i_j}, \hat{\phi}_{i_j})$ of the interfering signals,
the current directional complex vectors of the signal of interest and the interfering signals being computed, in a first iteration, with respect to the directional vectors assumed in step (d) and amplitude/phase errors of the amplitude/phase error matrix, then, for each of a plurality of following iterations, with respect to the directional vectors assumed in step (d) and to the amplitude/phase errors computed in the preceding iteration, a number of the iterations being predefined by a user;
(g) reconstruction of a correlation matrix of the interfering signals and of the noise;
(h) computation of a weighting matrix from the correlation matrix computed in step (g); and
(i) suppression of the interfering signals from the signal received in step (a) and retrieval of the signal of interest.

2. The method for receiving the signal and for suppressing the interfering signals as claimed in claim 1, wherein the number of iterations is between 15 and 25.

3. The method for receiving the signal and for suppressing the interfering signals as claimed in claim 1, wherein said number of iterations is 20.

4. A multi-channel receiver configured to (i) receive a signal comprising a signal of interest and interfering signals over a plurality of channels and (ii) reject the interfering signals, comprising:
an antenna comprising at least three radiating elements;
at least three radio chains for receiving, transposing, and discretizing said signal received over each of the channels of the receiver, to obtain a discretized multi-channel signal, the at least three radio chains each comprising one of the at least three radiating elements of the antenna; and
computing circuits, wherein the computing circuits are configured to suppress said interfering signals using the method of claim 1.

5. The multi-channel receiver as claimed in claim 4, wherein the computing circuits comprise at least one of a digital signal processor, a programmable integrated circuit, and an application-specific integrated circuit.

6. The multi-channel receiver as claimed in claim 5, wherein said multi-channel receiver belongs to a receiving portion of a payload of a satellite.

7. The multi-channel receiver as claimed in claim 4, wherein said multi-channel receiver belongs to a base station of a terrestrial mobile-radio system.

* * * * *